United States Patent
Gupta et al.

(10) Patent No.: US 9,613,123 B2
(45) Date of Patent: Apr. 4, 2017

(54) DATA STREAM PROCESSING

(75) Inventors: Chetan Kumar Gupta, Austin, TX (US); Song Wang, Austin, TX (US); Ismail Ari, Redwood City, CA (US); Ming C. Hao, Palo Alto, CA (US); Umeshwar Dayal, Saratoga, CA (US); Abhay Mehta, Austin, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 876 days.

(21) Appl. No.: 12/422,875

(22) Filed: Apr. 13, 2009

(65) Prior Publication Data

US 2010/0262613 A1 Oct. 14, 2010

(51) Int. Cl.
*G06F 7/00* (2006.01)
*G06F 17/30* (2006.01)
*G06F 17/00* (2006.01)

(52) U.S. Cl.
CPC .. *G06F 17/30592* (2013.01); *G06F 17/30705* (2013.01); *G06F 17/30994* (2013.01)

(58) Field of Classification Search
CPC ......... G06F 17/30994; G06F 17/30705; G06F 17/30592
USPC .......... 707/999.001–999.005, 736, 957, 773, 707/737, 956
See application file for complete search history.

(56) References Cited

U.S. PATENT DOCUMENTS

| | | | |
|---|---|---|---|
| 6,094,651 A * | 7/2000 | Agrawal | G06F 17/30592 707/999.002 |
| 6,385,604 B1 | 5/2002 | Bakalash et al. | |
| 6,408,292 B1 | 6/2002 | Bakalash | |
| 6,581,068 B1 | 6/2003 | Bensoussan et al. | |
| 6,757,689 B2 | 6/2004 | Battas | |
| 6,980,980 B1 | 12/2005 | Yeh | |
| 7,218,996 B1 * | 5/2007 | Beitelmal et al. | 700/276 |
| 7,424,489 B1 * | 9/2008 | Duffield et al. | 707/999.1 |
| 7,885,911 B2 * | 2/2011 | Cormode et al. | 706/46 |
| 7,987,177 B2 * | 7/2011 | Beyer et al. | 707/713 |
| 2006/0280378 A1 * | 12/2006 | Garofalakis et al. | 382/276 |
| 2007/0022092 A1 * | 1/2007 | Nishizawa et al. | 707/2 |
| 2007/0237410 A1 * | 10/2007 | Cormode et al. | 707/3 |
| 2008/0114744 A1 * | 5/2008 | Colby | G06F 17/30448 |
| 2008/0263096 A1 * | 10/2008 | Klein et al. | 707/104.1 |
| 2009/0045950 A1 * | 2/2009 | Miller | 340/540 |
| 2010/0083054 A1 * | 4/2010 | Marvasti | 714/47 |

OTHER PUBLICATIONS

Minos Garofalakis , Phillip B. Gibbons, Wavelet synopses with error guarantees, Proceedings of the 2002 ACM SIGMOD International conference on Management of data, Jun. 3-6, 2002, Madison, Wisconsin.*

(Continued)

*Primary Examiner* — Kannan Shanmugasundaram
(74) *Attorney, Agent, or Firm* — Trop, Pruner & Hu, P.C.

(57) ABSTRACT

A method of processing a stream of raw data from a plurality of distributed data producing devices includes reducing the raw data to a plurality of representative synopsis coefficients, organizing the synopsis coefficients into a data structure with at least three dimensions, including a time window dimension and an accuracy dimension. Responsive to a detected anomaly in the data structure, at least one of a predetermined autonomous action and an action directed by a user is performed.

25 Claims, 7 Drawing Sheets

(56) References Cited

OTHER PUBLICATIONS

Jessica Lin , Eamonn Keogh , Stefano Lonardi , Bill Chiu, A symbolic representation of time series, with implications for streaming algorithms, Proceedings of the 8th ACM SIGMOD workshop on Research issues in data mining and knowledge discovery, Jun. 13-13, 2003, San Diego, California.*

Lizheng Jiang, Dongqing Yang, Shiwei Tang, Xiuli Ma, and Dehui Zhang. 2006. Constructing Cube Blocks Effectively for Stream Data Analysis. In Proceedings of the Seventh International Conference on Web-Age Information Management Workshops (WAIMW '06). IEEE Computer Society, Washington, DC, USA.*

Abadi, Daniel J. et al.; "Aurora: a new model and architecture for data stream management";VLDB Journal; 2003; pp. 1-20; Springer-Verlag; Aug. 2003.

Agarwal, Sameet et al.; "On the Computation of Multidimensional Aggregates", pp. 1-16; 1996.

Vassiliadis, Panos et al.; "A Survey of Logical Models for OLAP Databases"; pp. 64-69; Dec. 1999.

* cited by examiner

DATA STREAM PROCESSING

BACKGROUND

In certain systems, data may be received by a processing device from one or more peripheral devices on a continual, periodic basis. Many systems that employ sensors to detect parameters of interest behave in this way. For example, the output of a sensor may be sampled on a periodic basis and written to a cache of the processing device, where the processing device can then access and manage the data according to a particular application. This type of continuously updated raw data is referred to as a data stream. Depending on the rate that data is received from peripheral device(s), the format of the data, and the number of peripheral device(s) contributing to the stream, the amount of data transmitted in a stream can vary considerably among applications.

Together with the general trend of increasing bandwidth capabilities in electronic devices, data streams in modern systems often transmit large amounts of data. In many situations, the information in a data stream may be used to make quick decisions in real-time that affect one or more other operations of the device processing the stream or a related business. Thus, it is often desirable for a device to process a received data stream as quickly and efficiently as possible.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
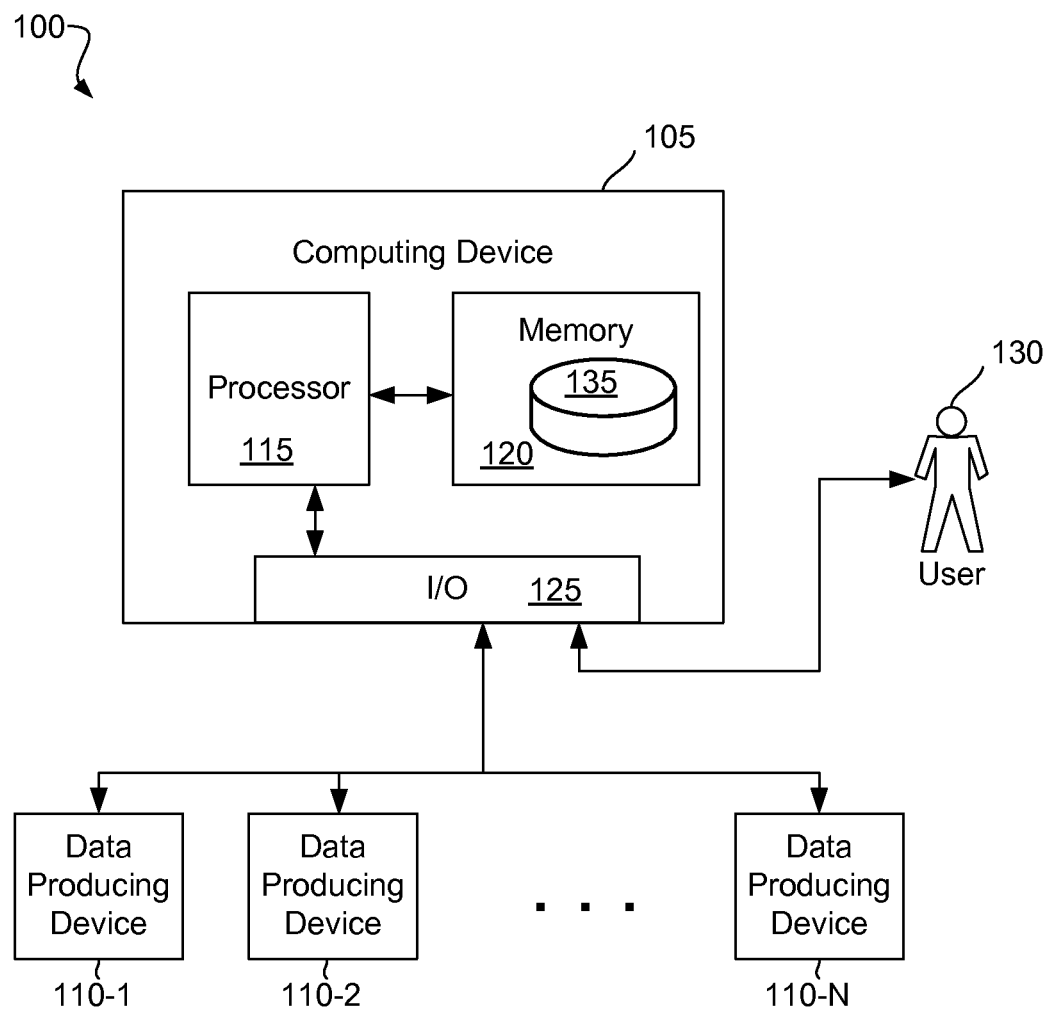
FIG. 1 is a block diagram of an illustrative system for processing a stream of data according to one exemplary embodiment of the principles described herein.

In some cases, it may be desirable to reduce the processing burden of a received input stream in a system. However, as described above, many systems acquire and process data streams of high volumes that can consume a significant portion of processing resources.

In consideration of these and other issues, the present specification discloses systems, methods, and computer program products for data stream processing, wherein raw data in a stream is reduced to a plurality of representative synopsis coefficients. The synopsis coefficients are organized into a data structure having at least three dimensions with hierarchical levels of abstraction, including a time window dimension and an accuracy dimension. A detected anomaly in the data structure can be remedied with at least one of a predetermined autonomous action and an action directed by a user.

As used in the present specification and in the appended claims, the term "data stream" refers to a succession of data elements made available over time.

As used in the present specification and in the appended claims, the term "synopsis coefficient" refers to a numeric value representative of two or more measured quantities or values.

As used in the present specification and in the appended claims, the term "cuboid" refers to a possible permutation of a multidimensional data structure with hierarchical dimensions.

As used in the present specification and in the appended claims, the term "data center" refers to a facility used to house a plurality of computing devices. Computing devices housed in a data center may include, but are not limited to servers and memory devices for servers, network equipment, and supporting hardware (e.g., sensors).

As used in the present specification and in the appended claims, the term "data producing device" refers to an apparatus or system configured to provide a measurement or digital data to a receiving device. The data producing device may transmit the data directly to the receiving device and/or provide the data at a node that is sampled by the receiving device. The data may include an analog measurement and/or a digital sequence of bits.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Referring now to FIG. 1, an illustrative system (100) for processing a stream of data is shown. The illustrative system (100) includes a computing device (105). The computing device (105) may be communicatively coupled to a plurality of data producing devices (110-1 to 110-N). The computing device (105) may include at least a processor (115) and memory (120). The memory (120) may be configured to store computer usable program codes that enable the computing device (105) to achieve a desired functionality.

The memory (120) of the computing device (105) may also be configured to store data from the data producing devices (110-1 to 110-N) and other data used by the program(s) being executed by the processor (115).

The computing device (105) may also have an input/output module (125) that includes software and hardware components for allowing the computing device (105) to communicate with the data producing devices (110-1 to 110-N). Particularly, raw data from the data producing devices (110-1 to 110-N) may be provided to the input/output module (125) of the computing device (105) in a stream, and the computing device (105) may provide information to and receive instructions from a user (130) via the input/output module (125). In certain embodiments, the computing device (105) may also transmit data and/or instructions to the data producing devices (110-1 to 110-N) via the input/output module (125).

In the present system (100), a stream of raw data from the data producing devices (110-1 to 110-N) may be processed by the computing device (105) reducing the raw data to a plurality of representative synopsis coefficients. The representative synopsis coefficients may then be organized into a multidimensional data structure including a time window dimension and an accuracy dimension. As will be explained in more detail below, these dimensions may have hierarchical levels of abstraction. The data structure may be stored in an in-memory database (135) or alternative portion of the memory (120) of the computing device. In response to a detected anomaly in the data structure, a predetermined autonomous action defined in the memory and/or program of the computing device, such as a notification to a user or a feedback signal sent to a controller, may be performed. Additionally or alternatively, such anomalies may be remedied by the user (130) after the user becomes aware of the anomalies through the input/output module (125) of the computing device (105).

Figure 2:
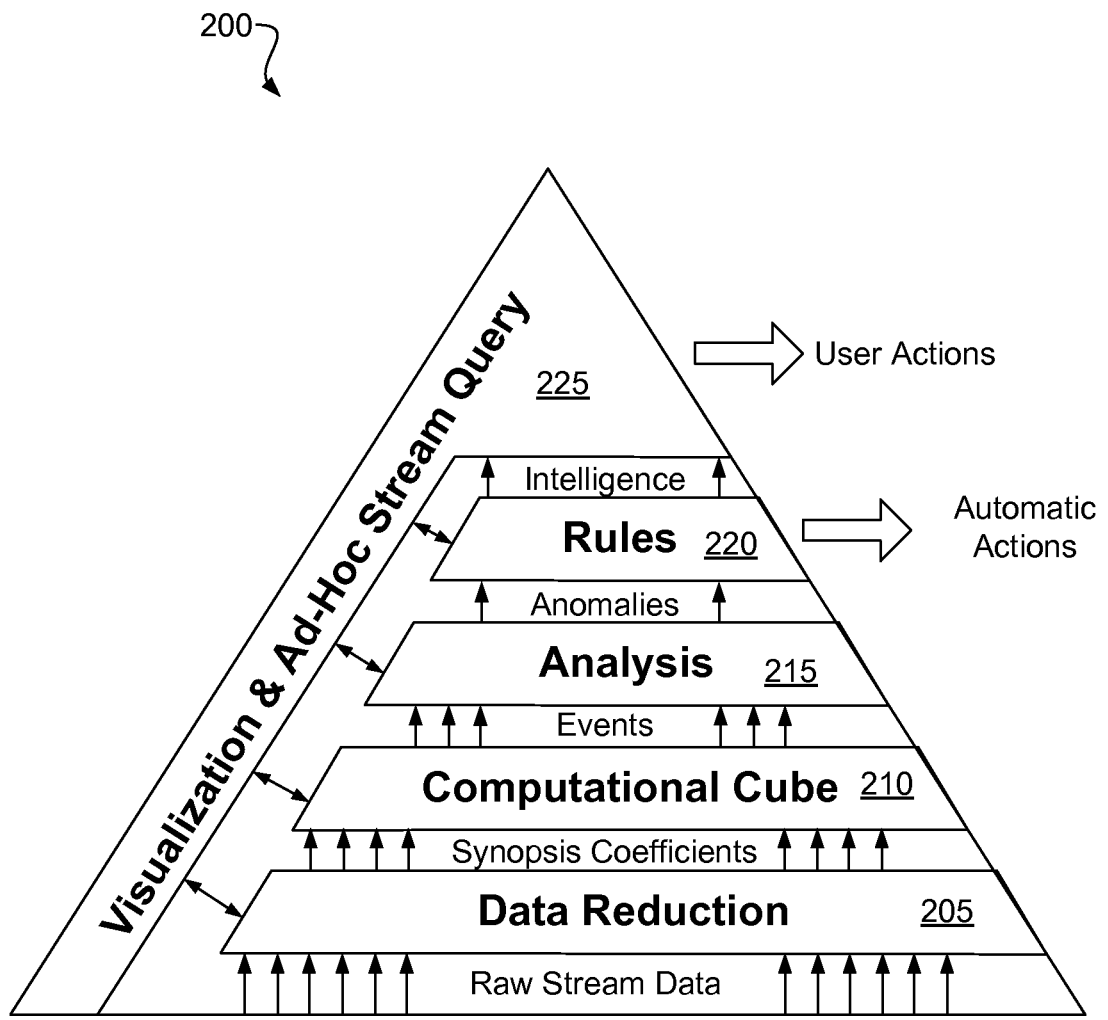
FIG. 2 is a diagram of an illustrative process of data stream processing according to one exemplary embodiment of the principles described herein.

Referring now to FIG. 2, a diagram is shown of a more detailed analysis of an illustrative process (200) of data stream analysis. The diagram illustrates the order of magnitude decrease in the volume of data managed through progressive levels of the process hierarchy.

In a first level (205) of processing, a stream of raw data is received by a computing device (105, FIG. 1) and reduced to a plurality of synopsis coefficients. These synopsis coefficients, which can restore the original data in the stream approximately, are employed to provide a summary with multi-level accuracy of the stream data.

In a second level (210), the synopsis coefficients are formed into a multidimensional data structure. In the present example, the data structure is referred to as a computational cube, the computational cube being an extension of traditional On-Line Analytical Processing (OLAP) data cubes known in the art. The computational cube used in the present example differs from traditional OLAP data cubes in that the computational cube utilizes at least two virtual dimensions, accuracy and window, that serve as default dimensions for the data stream analysis. The "measure" attributes of the computational cube (i.e., the data values organized within the cube according to the dimensions) may be the synopsis coefficients themselves and/or aggregate functions of the synopsis coefficients (e.g., COUNT, SUM, AVG, standard deviation, and the like). It will also be recognized that the term "cube" of "cuboid" as used herein refers to a data structure having more than two dimensions. Such data structures are not limited to a perfectly cubical geometry.

In a third level (215) of analysis, rules are applied to the computational cube to determine events that representative real-world conditions. For example, a "top k" rule may be used to determine the k most significant anomalies in the computational cube, which may published as events. These events may signify problems that need to be remedied. As such, a fourth level (220) of analysis may apply remedial rules (220) according to the events from the computational cube. The rules (220) may lead to automatic actions taken by the computing device to remedy the problems.

Additionally, visualization (225) of one or more of the four levels of analysis (205, 210, 215, 220) may be provided to a user in real-time. As such, the user may perform ad-hoc stream queries on the raw stream data, the synopsis coefficients, events in the computational cube, anomalies detected in the computational cube, and/or any other portion of the data or analysis process that may suit a particular application of the principles described herein. Users may interact with the visualization graph to select different coefficients/parameters and make a decision in real-time. With this information available to the user, the user may also initiate actions separate from the automatic actions generated by the rules in the fourth level (220) of analysis.

Figure 3:
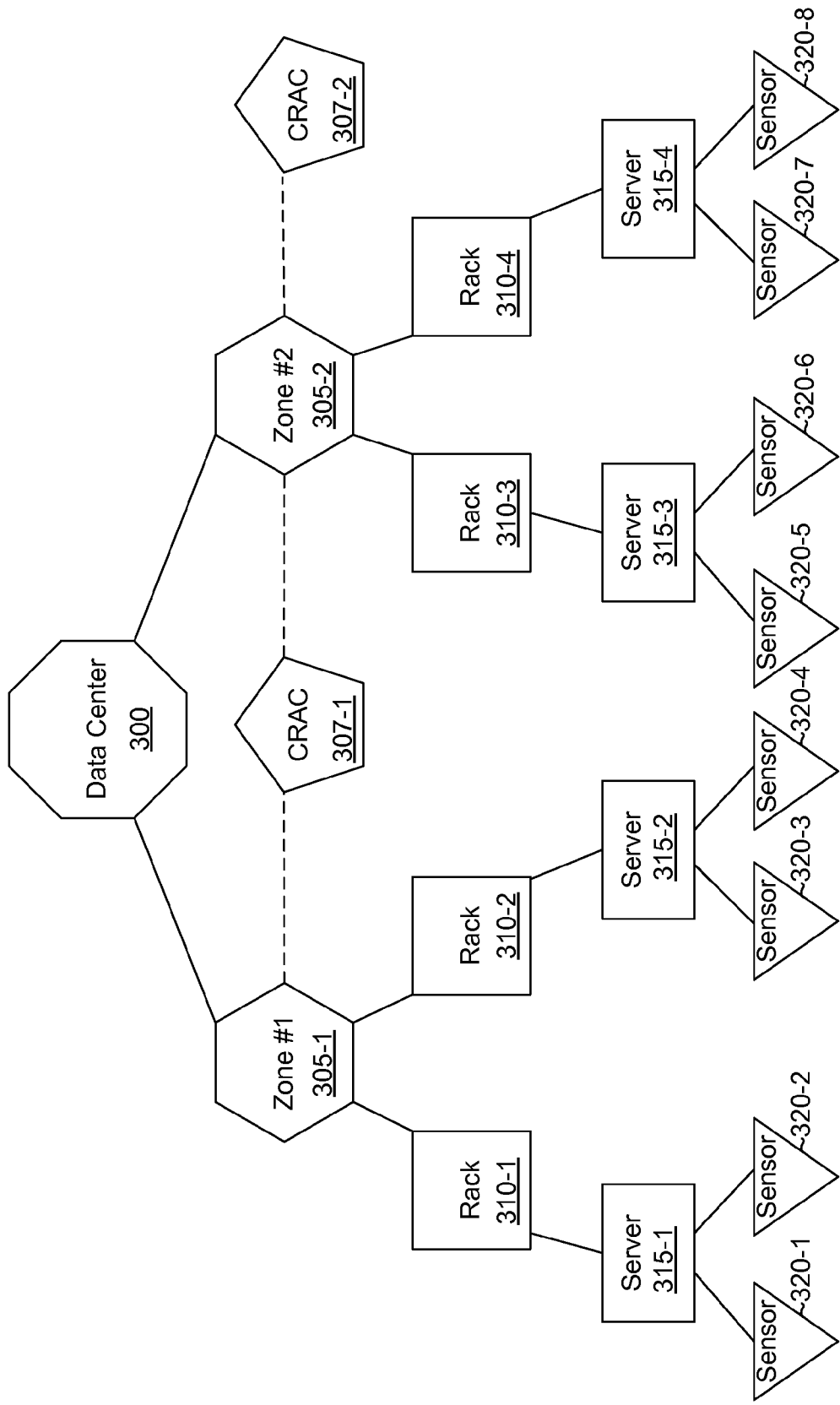
FIG. 3 is a diagram of an illustrative data center having a plurality of data producing sensors according to one exemplary embodiment of the principles described herein.

The principles of data stream analysis discussed in FIGS. 1 and 2 will now be illustrated with respect to the operations of a data center. Referring now to FIG. 3, a block diagram of an illustrative hierarchical architecture of a data center (300) is shown.

The illustrative data center (300) includes a plurality of zones (305-1, 305-2), which may be regions in the layout map either defined by a simple linear grid or by a complex formula. For example, if a zone (305-1, 305-2) is defined as the area under the influence of a Computer Room Air Conditioning (CRAC) unit (307-1, 307-2), then complex nonlinear models and dynamic controls may be used to define the borders of the zones (305-1, 305-2) within the data center (300). Each zone (305-1, 305-2) may include a plurality of racks (310-1 to 310-4), with each rack being configured to house a server (315-1 to 315-4) and storage resources for the server (315-1 to 315-4). In the present example, each rack slot may be equipped with temperature and/or other sensors (320-1 to 320-8) at the front and the back to read the input and output temperatures of the servers (315-1 to 315-4). In certain embodiments, each and every entity in the data center (e.g., racks, servers, sensors, and CRAC units) may be uniquely identifiable with a hierarchical addressing methodology.

Figure 4:
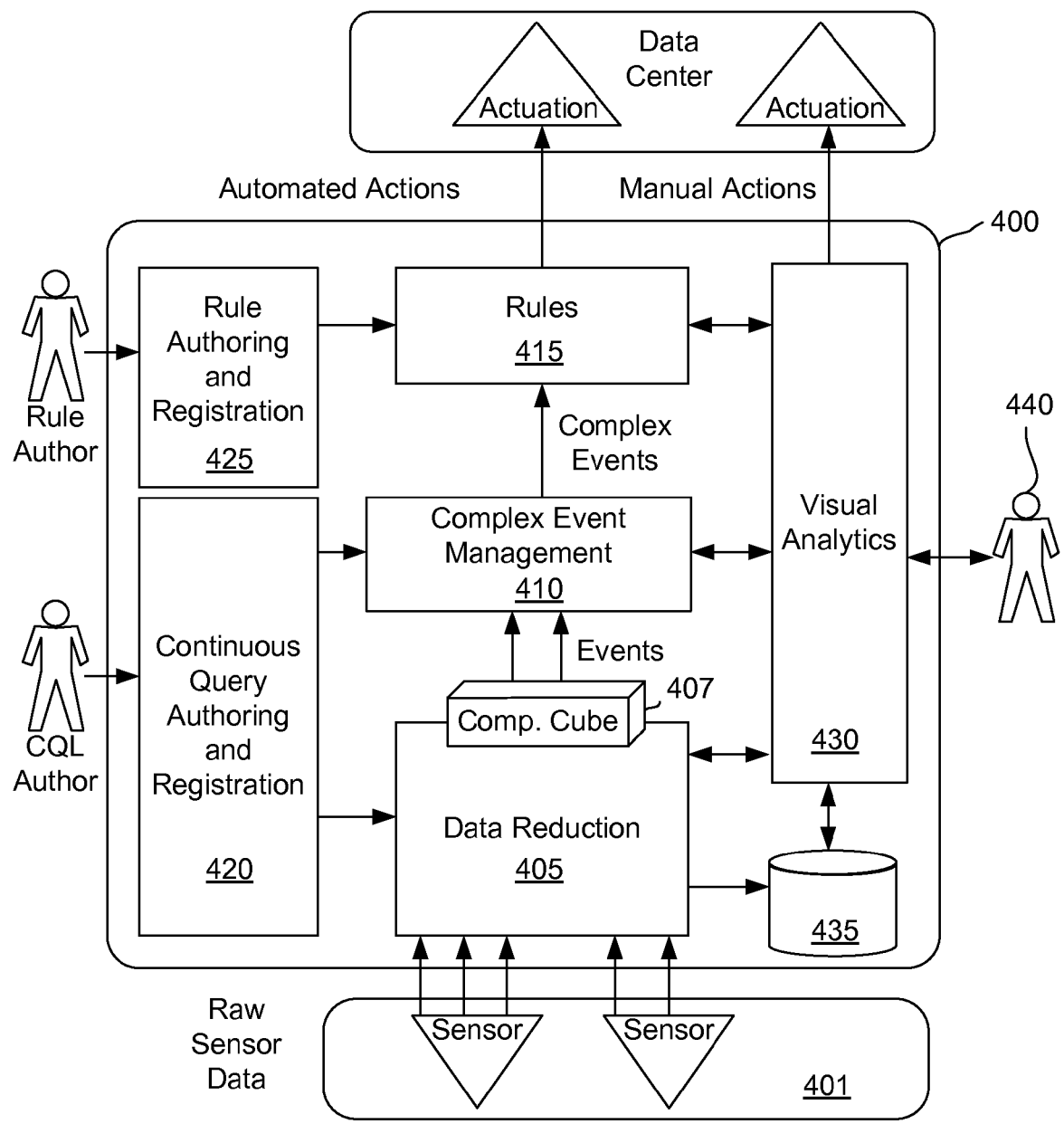
FIG. 4 is a diagram of an illustrative process of data stream processing for a data center according to one exemplary embodiment of the principles described herein.

Referring to FIG. 4, an illustrative data stream analysis architecture (400) is shown for the illustrative data center (300, FIG. 3) of FIG. 3. In the architecture (400), raw data from a plurality of distributed sensors (401) is reduced in a data reduction module (405) into synopsis coefficients that are stored in a computational cube data structure (407). The distributed sensors (401) may include the temperature sensors (320-1 to 320-8, FIG. 3) illustrated in FIG. 3 in addition to distributed sensors of other parameters of interest (e.g., humidity and CPU utilization). In the computational cube (407), the important information from the repetitive and superfluous sensor readings are summarized or eliminated, thereby reducing the data volume to be processed by subsequent modules. While the present example shows only data from temperature sensors, data from any type of sensor may be used as best suits a particular application of the principles described herein. The data reduction module (405) forms the computational cube (407) and outputs special events in the form of aggregated statistics or detected anomalies.

The output from the data reduction module (405) may be received by a complex event management module (410) which observes summarized events from the computational cube (407) and searches for rule-based patterns in the form of sequences, semantic correlations and/or threshold violations. While the statistical correlation functions in the data reduction module (405) measured the linear relationship between two random variables (e.g., two temperature sensor readings), the semantic correlation in the complex event management module (410) may compare two unrelated event types (e.g., temperature and humidity) originating from different types of sensor readings to describe a complex anomaly or event with higher level semantics than the original anomalies or events detected separately. For example, a hot water pipe may be broken if a localized region experiences both a significant temperature increase and a significant humidity increase within a short amount of time. The complex anomalies or events may be published with a name recognized by the system (e.g., HotWaterPipe_Broken_Event) into the output stream of the complex event management module (410).

The underlying engine of the data reduction and complex event management modules (405, 410) may be a data stream management system (DSMS) wherein continuous queries (CQs) authored using a Continuous Query Language (CQL) at a query module (420) are registered and run against the sensor data and synopsis coefficients. The CQL may be provided as a structured query language (SQL) extension or a custom declarative language.

The output stream of the complex event management module (410) may be received by a rules module (415) that applies predetermined rules to the complex anomalies or events. The predetermined rules may remedy or address problems indicated by the complex anomalies or events. For example, a rule may notify a human administrator of a problem that needs to be remedied by the administrator. In other examples, a rule may cause an autonomous action to be taken by the system that automatically remedies a detected problem. These rules may be defined using a rule authoring and registration module (425) prior to or during the processing of the data stream.

A visual analytics module (430) may allow a user (440) to access to all portions of the stream processing through a user interface component of a visual analytics module (430). The raw data from the stream and computational cube may be stored in a database (435) to which the visual analytics module (430) may have readable access. As such, the user may also run ad-hoc queries on the data in any of the modules (405, 410, 415), define additional rules, and/or take manual action to remedy problematic anomalies.

In certain embodiments, cell-based time series maps may be used to display high speed data center data in a window. Cells may be as small as pixels (the smallest elements on a screen). Each cell represents a synopsis coefficient or measurement. In certain embodiments, the color of a cell may represent the value of a synopsis coefficient or measurement (i.e., sensor temperature, rack temperature, etc). Additionally or alternatively, cells may be arranged from bottom to top and left to right, column by column, in a user-defined time interval (e.g., minutes, hours, days, etc.). Such interactive visualization may take place over the computational cube which offers multiple resolutions over dimensions including time. For receiving high-speed data, a variable resolution density display may be used, where the size of the cells decreases as more data is read to allow users to see the entire performance data in a single view.

Additionally or alternatively, a visual correlation map may be provided to the user to allow the user to interactively visualize the correlation between two selected measurements (e.g., two sensors). This type of display may allow a user to quickly visualize whether, in the example of temperature sensors, two temperature readings change at the same pace. If so, the two temperature sensors may have a similar air flow or workload.

Figure 5:
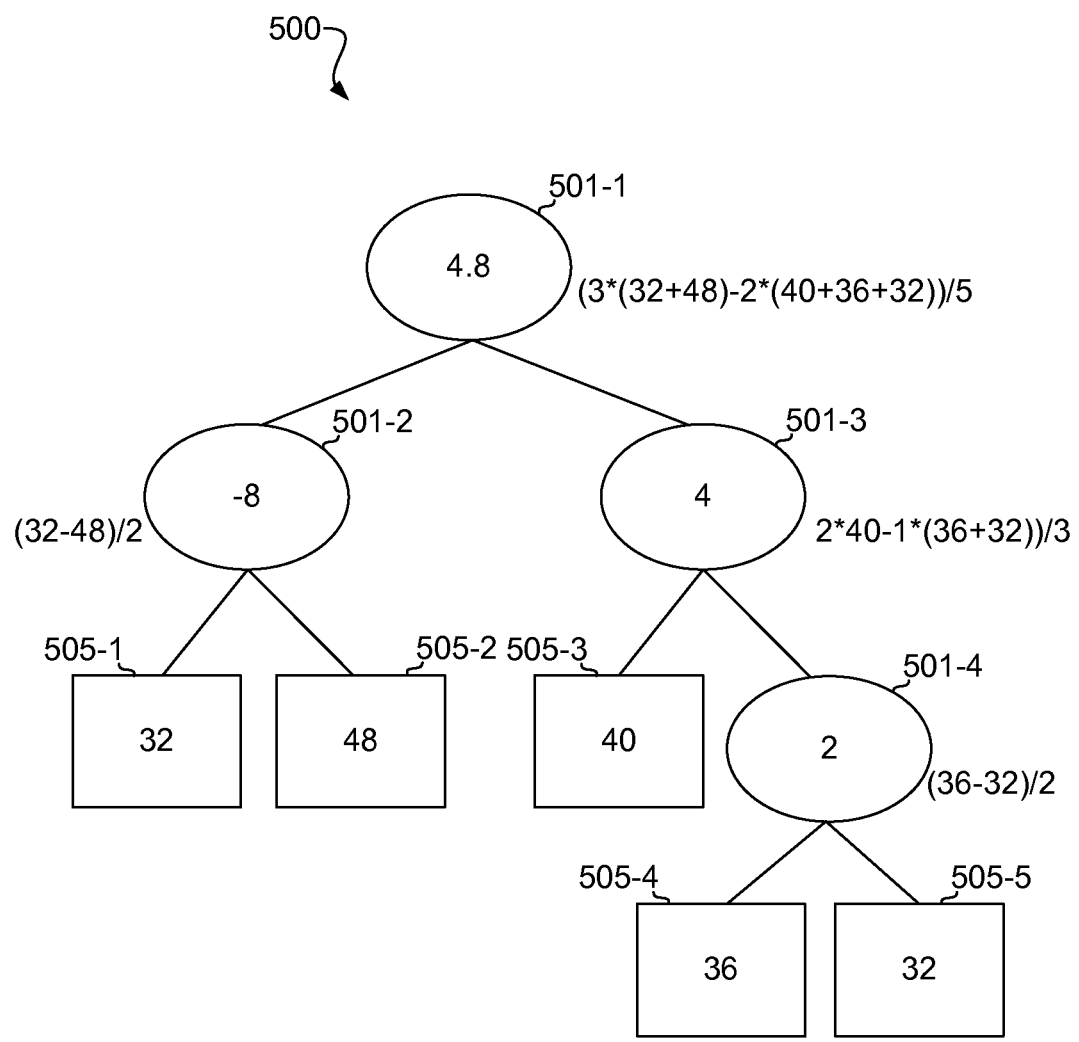
FIG. 5 is a diagram of an illustrative difference tree used to compute illustrative synopsis coefficients according to one exemplary embodiment of the principles described herein.

Referring now to FIG. 5, an illustrative process of data reduction is shown. The present process may be performed by a data reduction module (405, FIG. 4) implemented by a computing device (105, FIG. 1) in a system (100, FIG. 1) for processing a data stream. The process shown in the present example is merely one method of data reduction, and other methods of data reduction may be used as may suit a particular application of the principles described herein.

The present illustrative synopsis coefficients are computed using a hierarchical difference tree (500) having nodes (501-1 to 501-4) and leaves (505-1 to 505-5). The nodes (501-1 to 501-4) represent synopsis coefficients and the leaves (505-1 to 505-5) represent individual sensor readings. Each node may compute the weighted difference between the average values of a measure for its children to achieve a balanced normalization. Such weighted average differences are well-known, and exemplary "weighted average difference" calculations are shown in FIG. 5 for each synopsis coefficient determined in the hierarchical difference tree (500). Accordingly, the synopsis coefficients in the present example may also be called difference coefficients. At any instant, the tree may compute and report the top k difference coefficients to reduce the raw data. k may be defined according to a desired level of accurate representation in the data reduction (i.e., a higher k is more accurate, while a lower k results in a greater reduction).

For example, in a tree with five sensor readings, the five leaves (505-1 to 505-5) may have values of 32, 48, 40, 36, and 32 (e.g., degrees Celsius), respectively. The four synopsis coefficients of the nodes (501-1 to 501-4) are therefore 4.8, −8, 4, and 2, where 37.6 is the unnormalized average measurement. The top k synopsis coefficients indicate the top k anomalous behaviors of a region as compared to its peers. Thus, if a sensor temperature is very high compared to its neighbor, the synopsis coefficient representing the node that has the two sensors as its children will be high, and may be reported as one of the top k coefficients. Similarly, if all the temperatures in a rack are high, then the difference coefficient between the rack and a neighboring rack will be high.

Figure 6:
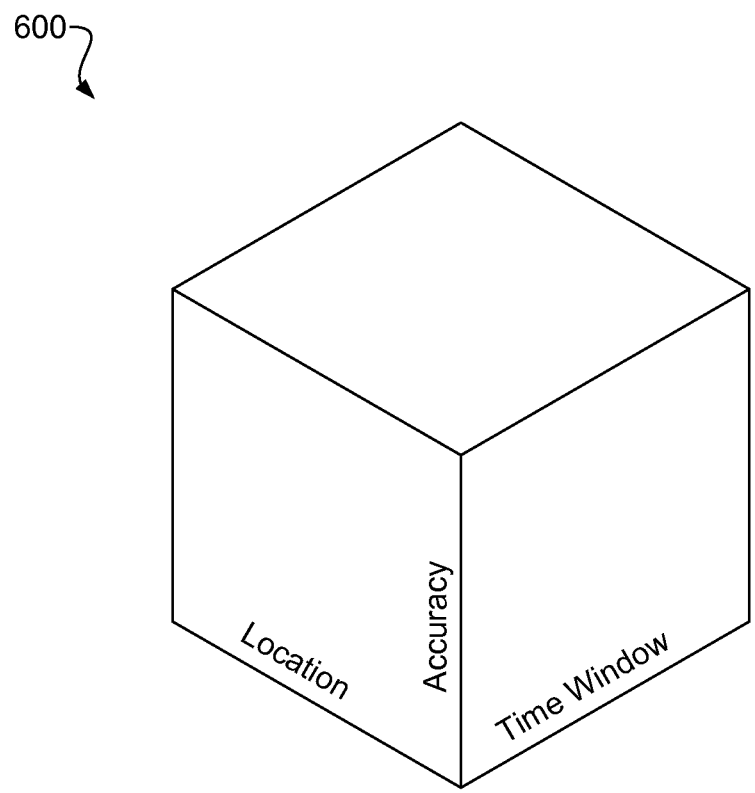
FIG. 6 is a diagram of an illustrative multidimensional data structure for storing synopsis coefficients according to on exemplary embodiment of the principles described herein.

Referring now to FIG. 6, an illustrative computational cube data structure (600) for storing synopsis coefficients is shown. The data structure (600) shown includes three dimensions—location, time window, and accuracy. In alternative embodiments, more dimensions may be included, particularly if measurements from more than one type of sensor are to be stored in the data structure (600).

In the present data structure (600), the location dimension may organize synopsis coefficients topologically (e.g., a unique addresses of the sensors represented, hierarchical position in system architecture of the sensors represented, etc.). The time window dimension may organize the synopsis coefficients according to the time period in which the represented sensor measurements were received, and the accuracy dimension may determine how many of the synopsis coefficients will be examined (i.e., k as explained above).

Continuing the example of FIGS. 3-5, because the data reduction module provides the top k synopsis coefficients in a hierarchical tree (500, FIG. 5), a larger k will result in more accuracy. For example, specifically referring to FIG. 5, a k value of 4 would provide the top 4 synopsis coefficients (4.8, −8, 4, 2). Since only 4 synopsis coefficients exist in the example of FIG. 5, a k value of 4 would reflect the highest available accuracy without using the actual sensor data. Similarly, a k value of 1 would provide only the most significant synopsis coefficient (−8). Since the set of top k coefficients is always a subset of the total number of coefficients, a conceptual hierarchy can be defined on the accuracy dimension that enables a roll-up/drill-down operation on accuracy.

To discretize the time domain, a minimal interest time unit may be established and raw timestamps to that unit may be approximated by rounding. This time unit may be used as the basis for aggregations over time windows in the time domain.

The dimensions of the computational cube data structure (600) may have hierarchical levels of abstraction. For example, a time window for gathering measurements can be defined as 1 second at one level, 3 seconds for another level (more abstract), and as 5 seconds for a third level (even more abstract). Of course, the actual number of levels of abstraction and time window values are implementation-specific and may vary widely. Because multiple dimensions of the computational cube data structure (600) may exhibit this hierarchical nature, many different permutations ("cuboids") of the computational cube may be construed according to different abstraction settings in the dimensions. For example the time unit can be rolled up into a hierarchy of time windows that can be examined according to a desired level of abstraction. Likewise, the location dimension may be such that hierarchical regions may be examined according to a desired level of abstraction.

However, a system may only materialize or compute a reasonable fraction of the possible cuboids in the computational cube data structure to allow efficient on-line computation of analysis queries. Accordingly, the computation and materialization of cuboids within the computational cube may be governed according to the principles of necessity in analyzing the data stream and workload sensitive computation (e.g., small time windows and low accuracy would be used when facing fast streams of data).

Illustrative Methods

Figure 7:
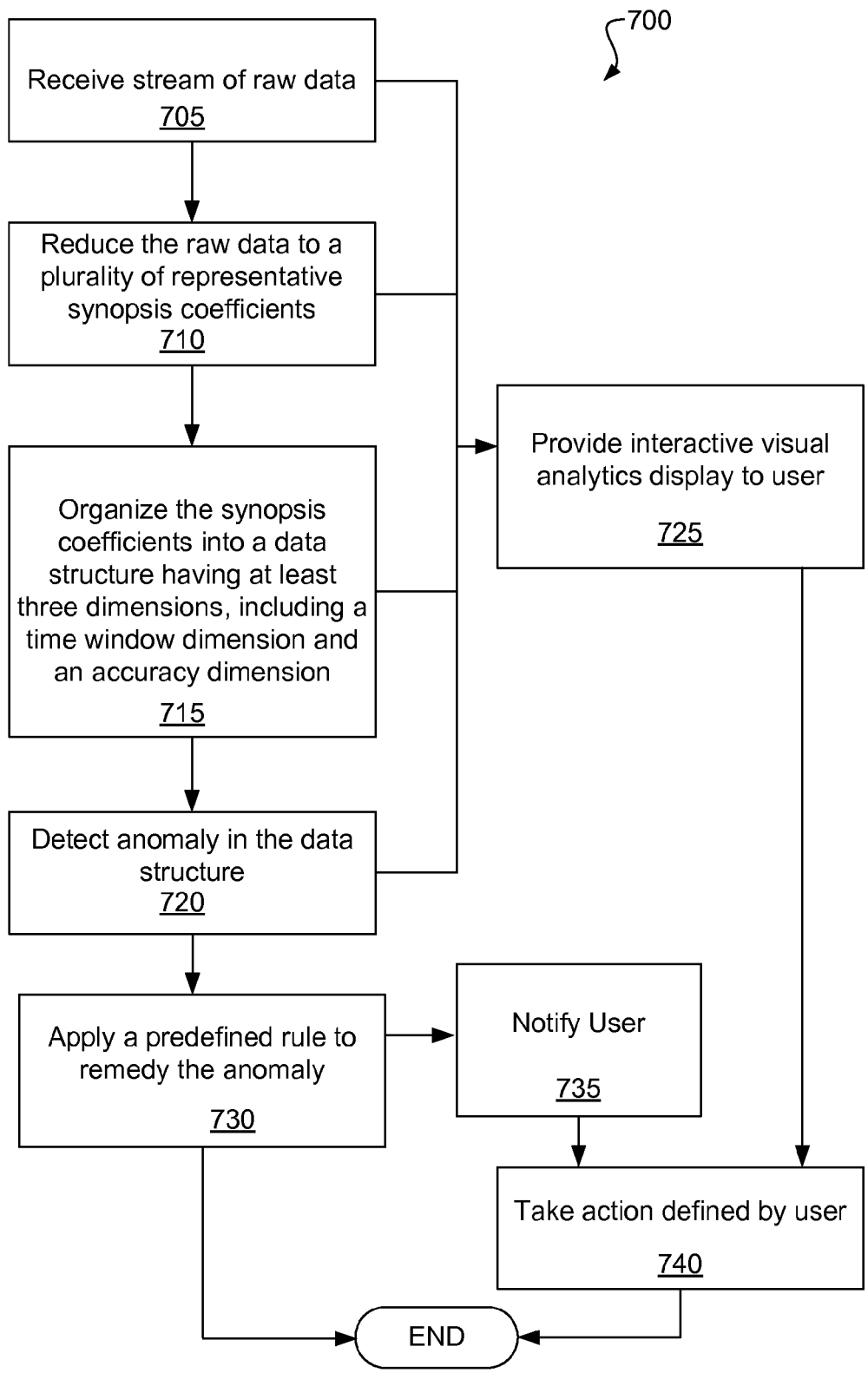
FIG. 7 is a flow diagram of an illustrative method of processing a stream of data, according to one exemplary embodiment of the principles described herein.

Referring now to FIG. 7, a flow diagram is shown of an illustrative method (700) of processing a stream of data. The method (700) may be performed, for example, by a computing device (105, FIG. 1) in a system (100, FIG. 1) having distributed data providing devices, such as sensors, communicatively coupled to the computing device (105, FIG. 1). In the method (700), a stream of raw data is received (step 705) and the raw data is reduced (step 710) to a plurality of representative synopsis coefficients. The synopsis coefficients are organized (step 715) into a data structure having at least three dimensions. These dimensions may include a time window dimension and an accuracy dimension. An anomaly may be detected (step 720) in the data structure, either automatically or with the assistance of a human user. Any and/or all of the raw data, the synopsis coefficients, and the detected anomalies in the data structure may be interactively displayed visually (step 725) to the user. Finally, responsive to the detected anomaly, a predefined rule may be applied (step 730) by the system to remedy the anomaly. This predefined rule may cause the system to autonomously remedy the anomaly (e.g., providing a feedback signal to a controller that takes steps to counteract the anomaly) and/or to notify (step 735) a user of the anomaly. A user notified of the anomaly by a predefined rule (step 735) and/or through the interactive visual analytics display (step 725) may take (step 740) an action to remedy the anomaly The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of processing a stream of raw data from a plurality of distributed data producing devices, said method comprising:
   reducing said raw data to a plurality of representative synopsis coefficients, each synopsis coefficient being a numeric value representative of two or more different values from said raw data;
   organizing said synopsis coefficients into a data structure comprising at least three dimensions, wherein said dimensions comprise a location dimension, a time window dimension and an accuracy dimension, and wherein the location dimension organizes the synopsis coefficients topologically, the time window dimension organizes the synopsis coefficients according to a time when the raw data was received, and the accuracy dimension determines how many of the synopsis coefficients are examined to identify two or more most significant anomalies;
   identifying the two or more most significant anomalies in a computational cube associated with the data structure; and
   responsive to the identification of the two or more most significant anomalies in the computational cube, performing a remedial action to remedy one or more problems associated with the two or more most significant anomalies.

2. The method of claim 1, further comprising providing an interactive visual analytics display to a user of at least one of: said stream of raw data, said synopsis coefficients, said data structure, said two or more most significant anomalies, and said predetermined autonomous action.

3. The method of claim 2, further comprising providing said interactive visual analytics display to said user in accordance with at least one level of abstraction determined by said user.

4. The method of claim 2, wherein said interactive visual analytics display comprises a correlation map between at least two selected measurements in said raw data.

5. The method of claim 1, wherein said data producing devices comprise sensors.

6. The method of claim 5, wherein said sensors are distributed throughout a data center.

7. The method of claim 1, wherein said synopsis coefficients are calculated by:
   forming a binary tree out of said raw data in said stream, said binary tree comprising hierarchical nodes and leaves, wherein said hierarchical nodes correspond to said synopsis coefficients and said leaves correspond to elements of said raw data; and
   computing a weighted difference between the average values of the child leaves of each parent node in said binary tree, wherein said computed weighted differences are said synopsis coefficients.

8. The method of claim 1, wherein said accuracy dimension of said data structure is dependent on a level of abstraction of said synopsis coefficients.

9. The method of claim 1, wherein said predetermined autonomous action comprises at least one of a notification to a user and a feedback signal sent to a controller.

10. The method of claim 1, wherein said accuracy dimension determines how many of said synopsis coefficients are used to detect for said anomaly.

11. A system, comprising:
a plurality of distributed data producing devices; and
at least one computing device communicatively coupled to said distributed data producing devices;
wherein said computing device is configured to:
reduce a stream of raw data received from said distributed data producing devices to a plurality of representative synopsis coefficients, wherein reducing a stream of raw data comprises aggregating the synopsis coefficients using one of a count function, an average function, and a standard deviation function;
organize said synopsis coefficients into a data structure comprising at least three dimensions, wherein said dimensions comprise a location dimension, a time window dimension and an accuracy dimension, and wherein the location dimension organizes the synopsis coefficients topologically, the time window dimension organizes the synopsis coefficients according to a time when the raw data was received, and the accuracy dimension determines how many of the synopsis coefficients are examined to identify two or more most significant anomalies; and
perform at least one of a predetermined autonomous response and a user directed action responsive to a detected anomaly in said data structure.

12. The system of claim 11, wherein said computing device is further configured to provide an interactive visual analytics display to said user, wherein said interactive visual analytics display comprises at least one of: said stream of raw data, said synopsis coefficients, said data structure, said detected anomaly, and said predefined rule.

13. The system of claim 11, wherein said computing device is further configured to calculate said synopsis coefficients by:
forming a binary tree out of said raw data in said stream, said binary tree comprising hierarchical nodes and leaves, wherein said hierarchical nodes correspond to said synopsis coefficients and said leaves correspond to elements of said raw data; and
computing a weighted difference between the average values of the child leaves of each parent node in said binary tree, wherein said computed weighted differences are said synopsis coefficients.

14. The system of claim 11, wherein said data producing devices comprise sensors.

15. The system of claim 14, wherein said sensors are distributed throughout a data center.

16. The system of claim 11, wherein said predetermined autonomous action comprises at least one of a notification to a user and a feedback signal to a controller.

17. The system of claim 11, wherein said accuracy dimension determines how many of said synopsis coefficients are used to detect for said anomaly.

18. The system of claim 11, wherein said computing device detects said anomaly in said data structure using at least one of sequence patterns, semantic correlations or threshold violations.

19. The system of claim 18, wherein said semantic correlation compares two different event types from different types of sensors among said data producing devices.

20. The system of claim 11, wherein said at least one computing device comprises a data stream management system wherein continuous queries are authored using a Continuous Query Language and run against said synopsis coefficients in said data structure to detect for anomalies.

21. A computer program product for processing a stream of raw data from a plurality of distributed data producing devices, said computer program product comprising:
a non-transitory computer usable medium having computer usable program code embodied therewith, said computer usable program code comprising:
computer usable program code configured to cause a computer to reduce said raw data to a plurality of representative synopsis coefficients using one of a count function, an average function, and a standard deviation function;
computer usable program code configured to cause said computer to organize said synopsis coefficients into a data structure comprising at least three dimensions, wherein said dimensions comprise a location dimension, a time window dimension and an accuracy dimension, and wherein the location dimension organizes the synopsis coefficients topologically, the time window dimension organizes the synopsis coefficients according to a time when the raw data was received, and the accuracy dimension determines how many of the synopsis coefficients are examined to identify two or more most significant anomalies; and
computer usable program code configured to, responsive to a detected anomaly in said data structure, perform at least one of a predetermined autonomous action and an action directed by a user.

22. The computer program product of claim 21, wherein said computer usable program code further comprises computer usable program code configured to cause said computer to provide an interactive visual analytics display to a user of at least one of: said stream of raw data, said synopsis coefficients, said data structure, said detected anomaly, and said predefined rule.

23. The computer program product of claim 22, wherein said interactive visual analytics display is provided to said user in accordance with levels of abstraction determined by said user.

24. The computer program product of claim 21, wherein said data structure comprises a plurality of possible cuboids according to variances in said hierarchical levels of abstraction in said dimensions, and only a certain number of said cuboids are computed using said synopsis coefficients.

25. The computer program product of claim 21, wherein said synopsis coefficients are calculated by:
forming a binary tree out of said raw data in said stream, said binary tree comprising hierarchical nodes and leaves, wherein said hierarchical nodes correspond to said synopsis coefficients and said leaves correspond to elements of said raw data; and computing a weighted difference between the average values of the child leaves of each parent node in said binary tree, wherein said computed weighted differences are said synopsis coefficients.

* * * * *